United States Patent [19]

Isozumi

[11] Patent Number: 5,208,482
[45] Date of Patent: May 4, 1993

[54] COAXIAL STARTER
[75] Inventor: Shuzoo Isozumi, Hyogo, Japan
[73] Assignee: Mitsubishi Denki K.K., Tokyo, Japan
[21] Appl. No.: 936,866
[22] Filed: Aug. 31, 1992

Related U.S. Application Data

[63] Continuation of Ser. No. 698,347, May 7, 1991, abandoned, which is a continuation of Ser. No. 357,132, May 26, 1989, abandoned.

[30] Foreign Application Priority Data

May 30, 1988 [JP] Japan ................................. 63-72152

[51] Int. Cl.$^5$ ........................ F02N 11/00; F02N 15/02
[52] U.S. Cl. ..................................... 290/48; 74/7 R; 290/38 R
[58] Field of Search ................... 74/7 R; 290/38 R, 48

[56] References Cited

U.S. PATENT DOCUMENTS

| | | | |
|---|---|---|---|
| 2,423,750 | 7/1947 | Benson | 29/596 X |
| 3,264,506 | 8/1962 | Carlson et al. | 29/596 X |
| 3,670,405 | 6/1972 | Dochterman | 29/596 |
| 4,291,235 | 9/1981 | Bergey, Jr. et al. | 290/55 |
| 4,394,582 | 7/1983 | Kreissl et al. | 290/52 |
| 4,613,761 | 9/1986 | Yabunaka | 290/36 R |
| 4,797,602 | 1/1989 | West | 290/46 |
| 4,806,811 | 4/1989 | Mayumi et al. | 310/89 |
| 4,853,570 | 8/1989 | Isozumi et al. | 310/78 |

FOREIGN PATENT DOCUMENTS

| | | | |
|---|---|---|---|
| 1311876 | 11/1962 | France. | |
| 90665 | 4/1988 | Japan | 290/48 |
| 209448 | 8/1988 | Japan | 290/48 |
| 1375721 | 11/1974 | United Kingdom | 310/89 |
| 2207291 | 1/1989 | United Kingdom | 310/89 |

OTHER PUBLICATIONS

"Transfer machining of Chrysler's new Starter Housing," *Machinery*, vol. 62, No. 4 (Dec. 1961), pp. 94–96.

Primary Examiner—Jeffrey A. Gaffin
Assistant Examiner—Robert Lloyd Hoover
Attorney, Agent, or Firm—Sughrue, Mion, Zinn, Macpeak & Seas

[57] ABSTRACT

A coaxial starter comprises an electric motor housed in a cylindrical yoke, a clutch mechanism for transmitting rotational force of the electric motor to an output shaft disposed on the same axis as an armature shaft of the electric motor, and a front bracket for supporting the output shaft. The yoke of the electric motor is formed of a metal sheet integrally with the front bracket through drawing.

1 Claim, 3 Drawing Sheets

COAXIAL STARTER

This is a continuation of application Ser. No. 07/698,347, filed May 7, 1991, now abandoned, which is a continuation of application Ser. No. 07/357,132, filed May 26, 1989, now abandoned.

BACKGROUND OF THE INVENTION

1. Field of the Invention

The present invention relates to a coaxial starter and more particularly to an improved frame of the coaxial starter.

2. Description of the Related Art

FIG. 2 shows a related art coaxial starter, as described in Japan Kokai No. 63-181643 to the invention.

A plurality of permanent magnets 7 are disposed on the inner circumferential surface of a yoke 8 which serves as a magnetic path for a field generated by the permanent magnets 7. The magnets 7 generate a magnetic field within an armature 1 of a motor as well. The end portion of the yoke 8 is fitted closely in a front bracket 10.

A roller 16 is provided on a cam 3a formed on the inner surface of a rotating shaft 3 and cooperates with a roller spring to form an overrunning mechanism.

A clutch inner 17 of the overrunning mechanism is supported by a bearing 18, which is fitted around the outer circumference of the clutch inner 17, and supports the front end portion of the rotating shaft 3. A helical spline formed on the inner surface of the clutch inner 17 fits slidably back and forth to a helical spline 20c formed on the outer circumference of a pinion shaft 20. The pinion shaft 20 is provided with a flange 20b to keep out dust and water and a pinion 20a at the end of the shaft 20. A stopper 21 is mounted to the rear end portion of the pinion shaft 20 to receive one end of a spring 23.

A bolt 39 connects the rear bracket 9 and the front bracket 10 together.

The described related art starter is of a construction in which the rotating shaft 3 of the motor mounted on the yoke 8 is to fit the assembly including the clutch inner 17, the bearings 19, 18 the roller, the pinion shaft 20 that are mounted on the front bracket 10 and then the front bracket 10 is secured to the yoke 8 by means of the bolts 39. This construction necessitates time consuming and complicated assembly work.

SUMMARY OF THE INVENTION

According to the invention, a coaxial starter comprises an electric motor housed in a cylindrical yoke, a clutch mechanism for transmitting rotational force of the electric motor to an output shaft disposed on the same axis as an armature shaft of the electric motor, and a front bracket for supporting the output shaft, wherein the yoke of the electric motor is formed of a metal sheet integrally with the front bracket through drawing. The one-piece construction of the yoke and the front bracket allows a quick assembly of various parts to the frame.

BRIEF DESCRIPTION OF THE DRAWINGS

Features and details of the invention will be apparent from description of specific embodiments of the invention with respect to the accompanying drawings in which.

DESCRIPTION OF THE PREFERRED EMBODIMENTS

Figure 1:
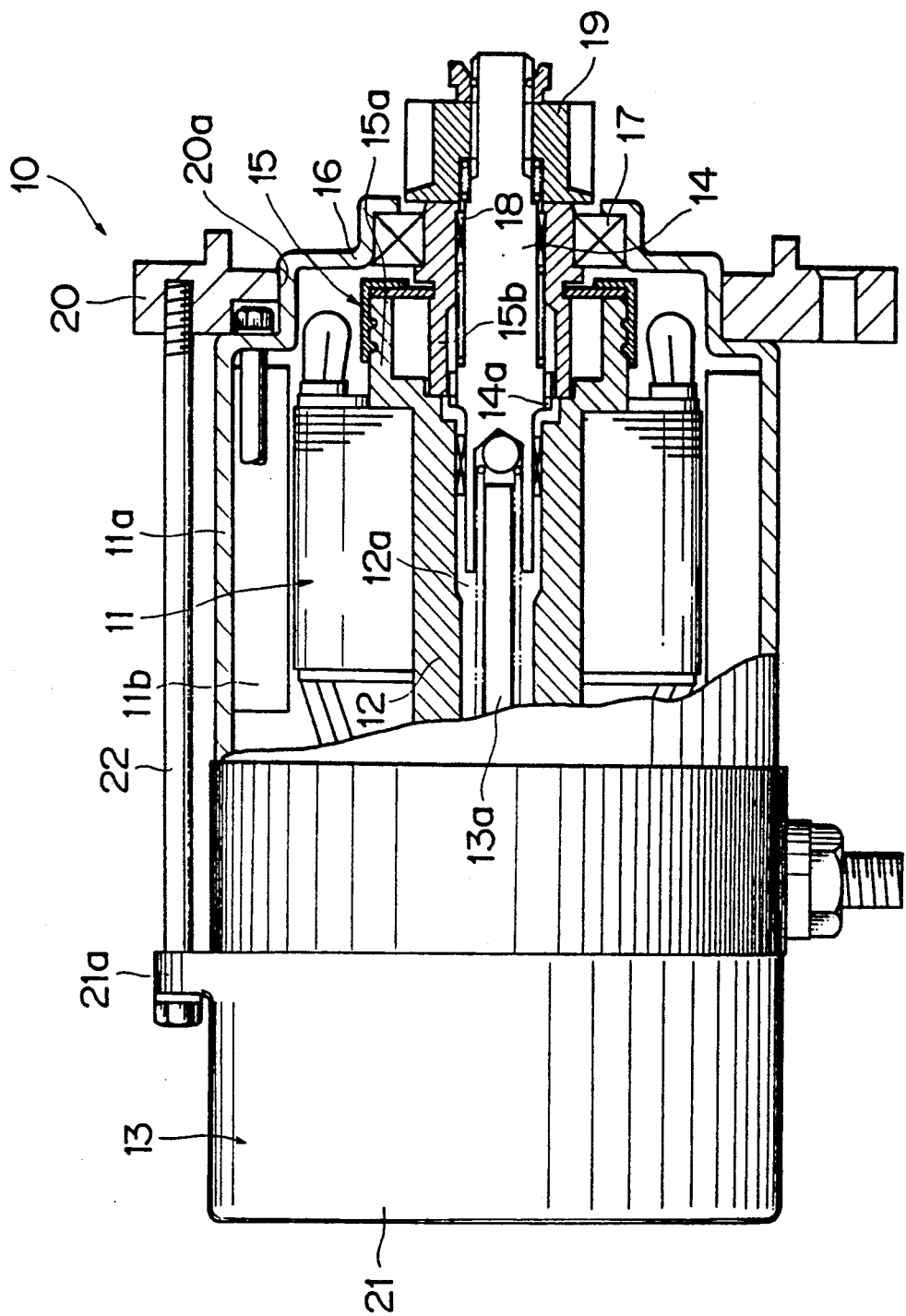
FIG. 1 is a cross-sectional view of a first embodiment of a coaxial starter according to the invention.
Figure 2:
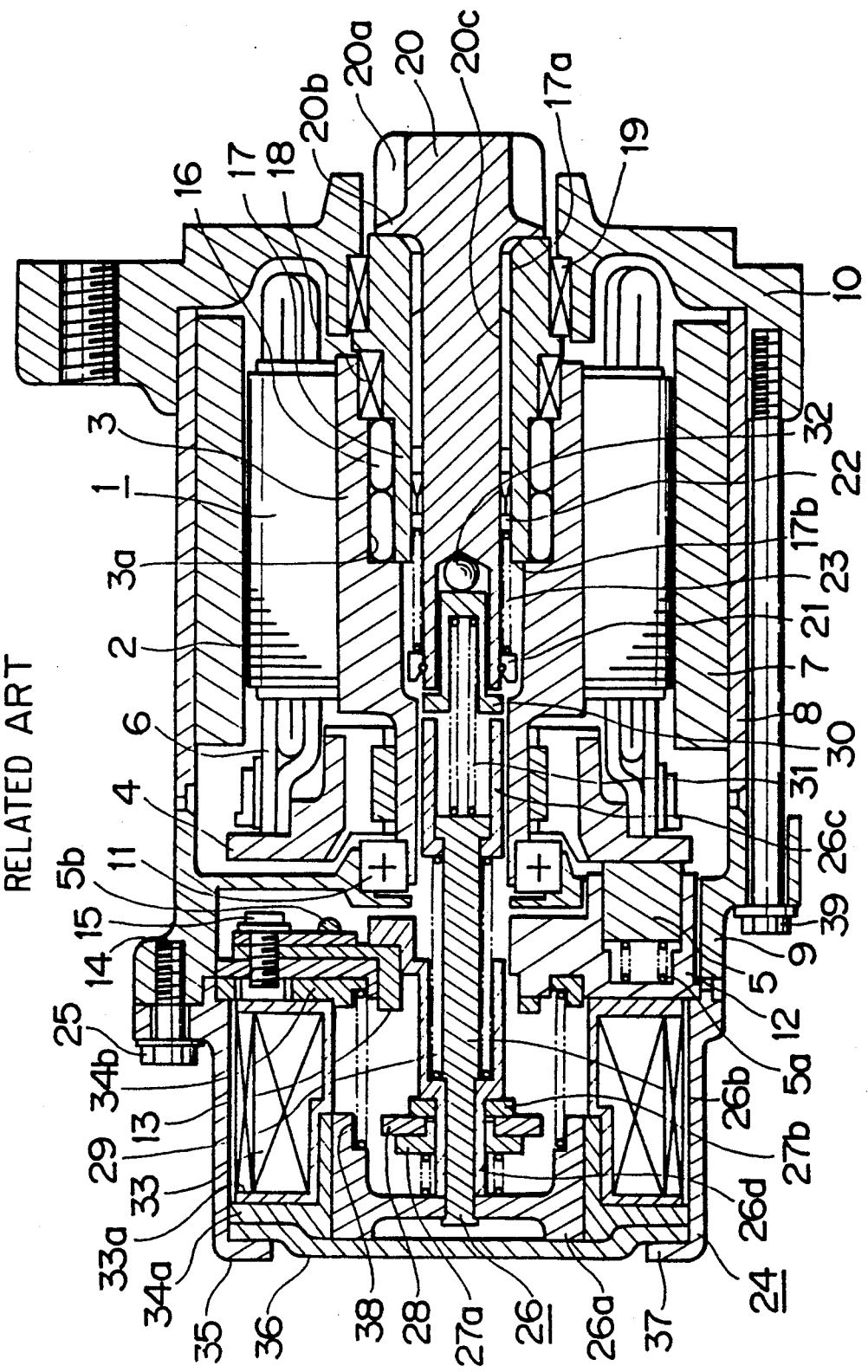
FIG. 2 is a cross-sectional view of a related art starter.

An embodiment of the invention will now be described in more details with reference to FIG. 1.

A plunger rod 13a of an electromagnetic switch 13 disposed at the rear end of a DC motor 11 extends through an armature rotating shaft 12 of the DC motor 11. The rear end portion of an output rotating shaft 14 is coaxially inserted into the front end portion of the electromagnetic rotating shaft 12. The plunger rod 13a is adapted to push the end of the rear end portion of the rotating shaft 14 to advance the rotating shaft 14 forwardly.

A one way clutch 15 is mounted to the front end portion of the electromagnetic rotating shaft 12 in fitting relation. A clutch outer 15a is formed integrally with the armature rotating shaft 12 as a one-piece member. A clutch inner 15b meshes with a helical spline 14a formed on the output rotating shaft 14, thereby causing the shaft 14 to slide axially along the spline while the rotation of the clutch inner 15b is transmitted to the output rotating shaft 14. A bearing 17 supports the front end portion of the clutch inner 15b. The bearing 17 is in turn supported by a later described front housing 16. Further, metal bearing inserted into the front portion of the clutch inner 15b supports the output rotating shaft 14 so that the shaft 14 can slide through the bearing 18.

To the front end portion of the output shaft 14 is mounted a pinion 19 which engages and disengages an engine ring gear (not shown). The pinion 19 meshes with the engine ring gear to drive it into rotation when the output rotating shaft 14 slides forwardly.

Figure 3:
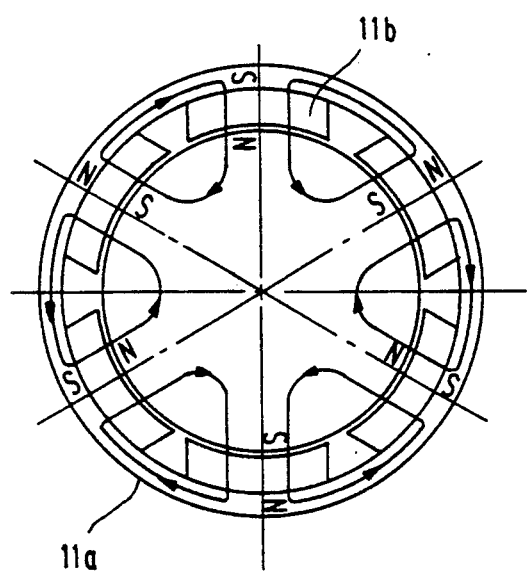
FIG. 3 is a cross-sectional view of a field magnet of a coaxial starter according to the invention.

Securely bonded to the inner wall of a yoke 11a of the DC motor 11 is a field magnet 11b made up of permanent magnets of at least six poles, as shown in FIG. 3. Forming the field magnet from at least six pole permanent magnets reduces the magnetic flux density. Further, the permanent magnets permit bonding of a core using an adhesive, eliminating the necessity of screwing or caulking the core as well as allowing a small thickness of the yoke 11a. This structure including the permanent magnets allows the yoke 11a to be formed by drawing a relatively thin metal sheet (for example an iron sheet) integrally with a hollow cylindrical front housing 16 that houses the one way clutch 15 and also supports the bearing 17.

In other words, drawing can be conveniently applied to making the yoke 11a, thereby permitting a one-piece construction of the front bracket 16 integral with the yoke 11a. Forming the front bracket 16 and the yoke 11a in a solid, one-piece member can reduce number of parts and facilitates the assembly process of the yoke, the front bracket, and associated components.

An engine-mounting plate 20 is mounted at an aperture 20a thereof to the front housing 16 in fitting relation and is secured to the outer circumference of the front housing 16 at an end portion of the yoke 11a, by means of mounting bolts 22 through holes in a flange 21a provided on a rear bracket 21.

The operation of the coaxial starter 10 embodied will now be described briefly as follows.

When a starter switch (not shown) is closed, an electromagnetic switch 13 is energized to cause a plunger therewithin to push the plunger rod 13a, thereby imposing an axial force to the plunger rod 13a. As a result, the plunger rod 13a pushes the output rotating shaft 14 to move longitudinally (e.g., axially). This causes the pinion 19 to be pressed against the engine ring gear while also causing a movable contact provided in the electromagnetic switch 13 to contact a fixed contact to thereby energize the DC motor 11. Thus the DC motor rotates to drive the engine ring gear into rotation via the one way clutch 15. When the engine starts to operate, the electromagnetic switch 13 is de-energized so that the plunger rod 13a and the output shaft 14 return to their original positions with the aid of a return spring. Thus the DC motor 11 is de-energized while at the same time the pinion 19 disengages the engine ring gear.

According to the invention, a general shape of the coaxial starter can be of an elongated hollow cylinder, which places no limitations on engine lay out. Using at least six poles of magnets as a field magnet provided on the inner wall of the yoke permits formation of the yoke from a relatively thin metal sheet, while also providing for easy manufacture of the front housing and the yoke integrally with each other, which reduces the number of parts and simplifies the assembly process.

What is claimed is:

1. A coaxial starter, comprising:
   an electric motor housed in a cylindrical yoke, said motor including an armature and an armature rotation shaft;
   a clutch mechanism for transmitting rotational force of said electric motor to an output shaft disposed on the same axis as an armature shaft of the electric motor, said clutch mechanism having a clutch inner and a clutch outer, said clutch outer being formed adjacent said armature of said electric motor integrally and continuously with said armature rotation shaft, said clutch outer having a portion engaging said clutch inner, said portion of said clutch outer having a diameter greater than that of said armature rotation shaft;
   a front bracket for supporting the output shaft;
   field magnet means bonded to an inner circumferential surface of said yoke, said field magnet means comprising a plurality of arcuate permanent magnets defining an even number of poles pointing radially inwardly, wherein a number of said poles pointing radially inwardly is at least six to reduce the magnetic flux density in the yoke and attendantly minimize the radial thickness of the yoke;
   a mounting plate mounted at an aperture of said front bracket and secured to an outer circumferential surface of said front bracket at an end portion of said yoke;
   a rear bracket having a flange; and
   a mounting bolt provided through holes in said flange and secured to said mounting plate;
   said yoke of said electric motor being formed of a metal sheet integrally with said front bracket through drawing to form a unitary construction.

* * * * *